(12) United States Patent
Goldschmidt

(10) Patent No.: US 7,292,246 B2
(45) Date of Patent: Nov. 6, 2007

(54) INCREMENTAL PLOTTING OF NETWORK TOPOLOGIES AND OTHER GRAPHS THROUGH USE OF MARKUP LANGUAGE

(75) Inventor: Cassio Brun Goldschmidt, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/403,525

(22) Filed: Apr. 12, 2006

(65) Prior Publication Data

US 2006/0181531 A1    Aug. 17, 2006

Related U.S. Application Data

(63) Continuation of application No. 09/905,306, filed on Jul. 13, 2001, now Pat. No. 7,075,536.

(51) Int. Cl.
*G06T 11/20* (2006.01)
(52) U.S. Cl. ........................ 345/440; 715/513
(58) Field of Classification Search ............... 345/440; 715/513
See application file for complete search history.

(56) References Cited

U.S. PATENT DOCUMENTS

| | | | |
|---|---|---|---|
| 3,684,871 A | 8/1972 | Schaffner | |
| 5,276,789 A | 1/1994 | Besaw et al. | |
| 5,568,605 A | 10/1996 | Clouston et al. | |
| 5,748,188 A | 5/1998 | Hu et al. | |
| 5,937,417 A | 8/1999 | Nielsen | |
| 6,040,834 A | 3/2000 | Jain et al. | |
| 6,067,573 A | 5/2000 | Tam et al. | |
| 6,091,424 A | 7/2000 | Madden et al. | |
| 6,225,999 B1 | 5/2001 | Jain et al. | |
| 6,369,819 B1 | 4/2002 | Pitkow et al. | |
| 2002/0158897 A1 | 10/2002 | Besaw et al. | |
| 2002/0161903 A1 | 10/2002 | Besaw | |

OTHER PUBLICATIONS

"Graph Layout Toolkit," http:/www.tomsawyer.clm/glt/index.html, downloaded Jul. 12, 2001.

(Continued)

*Primary Examiner*—Kee M. Tung
*Assistant Examiner*—Motilewa Good-Johnson
(74) *Attorney, Agent, or Firm*—Hickman Palermo Truong & Becker LLP

(57) ABSTRACT

Plotting a graph using a markup language comprises receiving a request to generate a display of a graph of nodes connected by links and focused on a first entity; retrieving first graph information describing the first focus entity and first nodes and links to the first entity; creating a first markup language document with the first graph information, which when rendered in a display causes plotting the first entity and first nodes and links; receiving a request to change the display to focus on a second entity; retrieving second graph information describing only second nodes and links to the second entity; creating a second markup language document that contains only the second graph information and which when rendered causes plotting both the first focus entity and the second focus entity without repeated rendering of the first markup language document.

34 Claims, 7 Drawing Sheets

OTHER PUBLICATIONS

"Graph Layout Toolkit, Incremental Layout," http:/www.tomsawyer.clm/glt/incremental.html, downloaded Jul. 12, 2001.

Brochure, "Graph Layout Toolkit," Tom Sawyer Software, 1992-2001, 8 pages.

Brochure, "Graph Editor Toolkit," Tom Sawyer Software, 1998-2001, 4 pages.

Elliotte Rusty Harold, "Structuring Complex Content for the Web, XML Extensible Markup Language," 1998, pp. 1-13, 16, 57-73, 133-178, 209-226.

Keller et al., Determining Service Dependencies in Distributed Systems, IEEE, 2001, pp. 2084-2088.

US 7,292,246 B2

INCREMENTAL PLOTTING OF NETWORK TOPOLOGIES AND OTHER GRAPHS THROUGH USE OF MARKUP LANGUAGE

CROSS-REFERENCE TO RELATED APPLICATIONS; PRIORITY CLAIM

This application claims domestic priority under 35 U.S.C. 120 as a Continuation of prior application Ser. No. 09/905,306, filed Jul. 13, 2001, now U.S. Pat. No. 7,075,536 the entire contents of which are hereby incorporated by reference for all purposes as if fully set forth herein.

FIELD OF THE INVENTION

The present invention generally relates to computers, and more specifically to methods for plotting network topologies and other graphs.

BACKGROUND OF THE INVENTION

Plotting and displaying graphs on a computer display screen is often a rigorous process, requiring the specification of the location (i.e., x-y coordinates) of each entity on the display screen. The demands involved with plotting graphs are especially evident when plotting network topologies. The optimal viewing location of a node of interest is dependent on the number of connections the node has to other nodes. In addition, the number of nodes and connections associated with a network is often dynamic. Hence, it becomes even more difficult to determine and specify an optimal screen location for a node, and to avoid crossing connections. If these challenges are not overcome, the result is often a congested graph, which is difficult to view and interpret, or a very large graph whereby a user must perform many scroll and zoom operations to view desired information.

Furthermore, when displaying a large graph or network topology, rendering all of the entities or network nodes is a waste of processing resources and a waste of display screen space. Displaying the entire network topology is not practical, and is analogous to unfolding an entire city map when only cross street information is wanted. In addition, when a user is viewing a displayed graph focusing only on a first entity or node, and wants to view the nodes connected to a secondary node, requiring retrieval from a data source (for example, a network management system) of all of the information associated with the first node and the secondary node is a waste of network bandwidth.

Although a web browser is often used for displaying network topologies and might be the most logical interface from a software design perspective, most markup languages (e.g., HTML) fail to efficiently serve this purpose. One reason is that most markup languages were not designed with this need in mind. That is, they were not designed for incrementally plotting and displaying large, dynamic network topologies, but rather static text and images. In addition, transmitting an image file to a browser is a demand on network bandwidth.

Based on the foregoing, it is clearly desirable to provide a technique that overcomes the challenges in efficiently and effectively plotting large network topologies and other graphs. A more specific, previously unmet, need exists for a technique to plot such graphs through a web browser.

SUMMARY OF THE INVENTION

The foregoing needs, and other needs that will become apparent from the following description, are satisfied by the present invention, which comprises, in one aspect, a method for plotting network topologies and other graphs through use of markup language.

Upon retrieval of graphic information from a data source and according to a user request, the graphic information is received by a graphic application as a markup language document. The markup language document follows a document type definition, which defines elements and associated attributes and which, in conjunction with the graphic information, facilitates incremental graph plotting by the graphic application. The plotting process is performed such that a request for a second graphic display initiated through interaction with a first graphic display does not require retrieving again the graphic information associated with the first graphic display. Furthermore, the second graphic display is plotted without requiring resending and plotting again the first graphic display, thus conserving processing resources. For example, if the color of a graphical image is all that needs to be changed, only information about the specific node need be sent to the graphic application, not the graphic information for the entire network. Multiple display arrangements are available for plotting a graphic display, whereby the graph is automatically laid out in a specified arrangement.

In embodiments of the invention, the graphic information includes image, image label, and connection information for specifying features of the graphic display. In addition, tool tips, click actions, and popup menu functions can be defined to execute upon a user interaction with various portions of the display. Examples of information that such functions may retrieve and display are site link, router, and subnet information associated with a network node or other focus entity.

Furthermore, aspects of the invention are implemented in a computer system, an apparatus, and a computer readable medium.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method for plotting a graph using a markup language is described. An aspect of the method is used to plot a network topology.

In the following description, for the purposes of explanation, numerous specific details are set forth in order to provide a thorough understanding of the present invention.

It will be apparent, however, that the present invention may be practiced without these specific details. In other instances, well-known structures and devices are shown in block diagram form in order to avoid unnecessarily obscuring the present invention.

In view of the shortcomings described above in relation to laying out and plotting network topologies simply, clearly and efficiently, a method for incrementally plotting a network topology is highly desirable.

The present invention comprises, in one aspect, a method for incremental plotting of network topologies and other graphs. Other aspects and features of the invention will become apparent from the following detailed description. For example, in other aspects, the invention encompasses a computer system, an apparatus, and a computer readable medium configured to carry out the steps described herein.

General Overview

According to one aspect of the invention, upon a request for a graphic display, the request is transmitted to a server application for retrieving the necessary information from a data source and returning such information in a markup language document. The markup language document and associated document type description (DTD) facilitate the delivery and parsing of graphical information to a graphic application for incremental plotting of graphs. An elaboration of a first graph can be plotted without having to retrieve the entire data from the source a subsequent time and without having to re-plot the first graph. The markup language additionally facilitates presentation of various content-related information in response to interactions with the graph.

Another aspect of the invention utilizes the markup language document and DTD to plot network topologies, for example, for use by a directory service. A topology can be displayed in a number of configurations, one display configuration being with a node of interest centered on the screen, with related entities or network connected nodes displayed in relation to the node of interest in a clear, concise manner.

Embodiments are at times described with reference to plotting network topologies as one exemplary context in which the processes described herein can be implemented. However, the invention is not limited to use with network topologies. The methods described herein are applicable to plotting, and thus providing a visual representation of, any information comprising related entities.

Operating Environment Example

Figure 1:
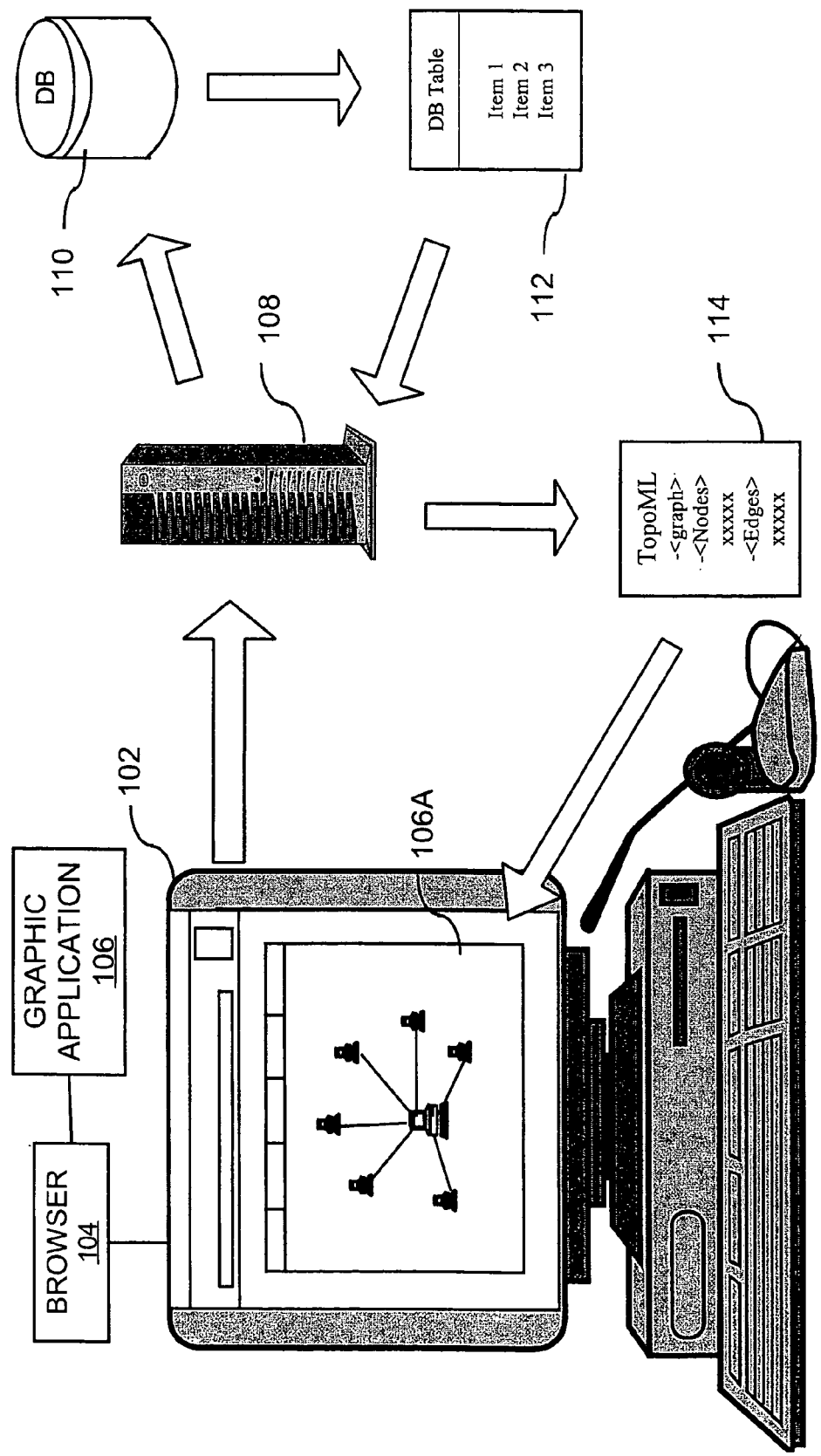
FIG. 1 is a diagram illustrating an example of an environment in which aspects of the invention may operate.

FIG. 1 is a diagram illustrating an example of an environment in which aspects of the invention may operate. In one aspect of the invention, the methods described herein are embodied in a computer software application executable on a workstation 102. A user at the workstation 102 can make a request for a graphic display, which initiates the process of incrementally plotting a graph. A computer system on which the application may execute, such as workstation 102, is described in reference to FIG. 7. The workstation 102 includes a display screen, which is used for providing a user interface to the application and for displaying the requested graphic display. The workstation 102 also includes a network interface for communicating with other devices over a network.

According to one embodiment, the user interface is a web browser 104, such as Netscape Navigator or Microsoft Internet Explorer. The browser 104 is used to make a request for a graphic display. The request can be in the form of a HTTP (Hypertext Transfer Protocol) request generated based on a URL (Uniform Resource Locator) entered into the appropriate field of the browser 104, and includes information representing the requested graphic display. For example, the request may include the focus entity and the number of hops from the focus entity to be encompassed in the graphic display. Herein, in the description of embodiments in which a network topology is plotted, the focus entity is referred to as a node of interest. The URL is used to access a CGI (Common Gateway Interface) application stored and executing on a server 108, which is a combination of computer hardware and software configured for communicating with other devices over a network through appropriate protocols, such as TCP/IP (Transmission Control Protocol/Internet Protocol). CGI is a standard process used by a server to pass a user's request to an application program and to receive data back to forward to the user. Alternatively, the request may take the form of a text file serving as an application input file, wherein a user specifies nodes and connections of interest. Further, the request may be generated programmatically by another process or program.

In response to the request, the CGI application executing on server 108 retrieves graph information from a data source such as database 110. Various CGI applications can be developed to access information that is necessary for plotting various graphs. CGI applications utilized in conjunction with the methods described herein can be developed to fit the specific needs of implementations of the inventive methods for incrementally plotting a graphic display. Regardless of the implementation, the database 110 returns a data table 112 to the server 108, whereby a CGI application (which can be the same or a different application as the requesting application) converts the data in the data table 112 into a markup language (ML) document 114 following a specific DTD, and transmits the ML document 114 to a graphic application 106 executing on workstation 102. The graphic application 106, which functions as a DTD "reader," interprets and processes the ML document 114 according to the DTD to plot the requested graphic display. In one embodiment, the graphic application 106 is a plug-in application to the browser 104, and may be an applet written in a suitable programming language such as Java. In addition, the applet may be downloaded to a client browser along with a web page. Therefore, the graphic application 106 is usable as a stand-alone application running on a workstation configured with a Java runtime environment or inside a Java-enabled web browser. The graphic application 106 opens an application window 106A within the browser 104, wherein the requested graphic display is plotted.

Graphic application 106 processes a structured markup language document, such as ML document 114, in accordance with a specific DTD. In one implementation, the ML document 114 is based on XML (Extensible Markup Language), such that it can be exchanged with other applications that support XML. Use of XML is a flexible way to create common information formats and share both the structure of the data and the data. The XML language describes a class of data objects called XML documents and partially describes, in a DTD, the behavior of computer programs which process them. In general, XML documents include tags that name fields and mark the beginnings and ends of fields, and include values for those fields. The XML format is described in detail at www.oasis-open.org/cover/xml.html and at the sites listed there. In another implementation, the ML document 114 is in a format comprising parameters for passing to a Java applet for execution.

Methods for Plotting Graphs

Figure 2A:
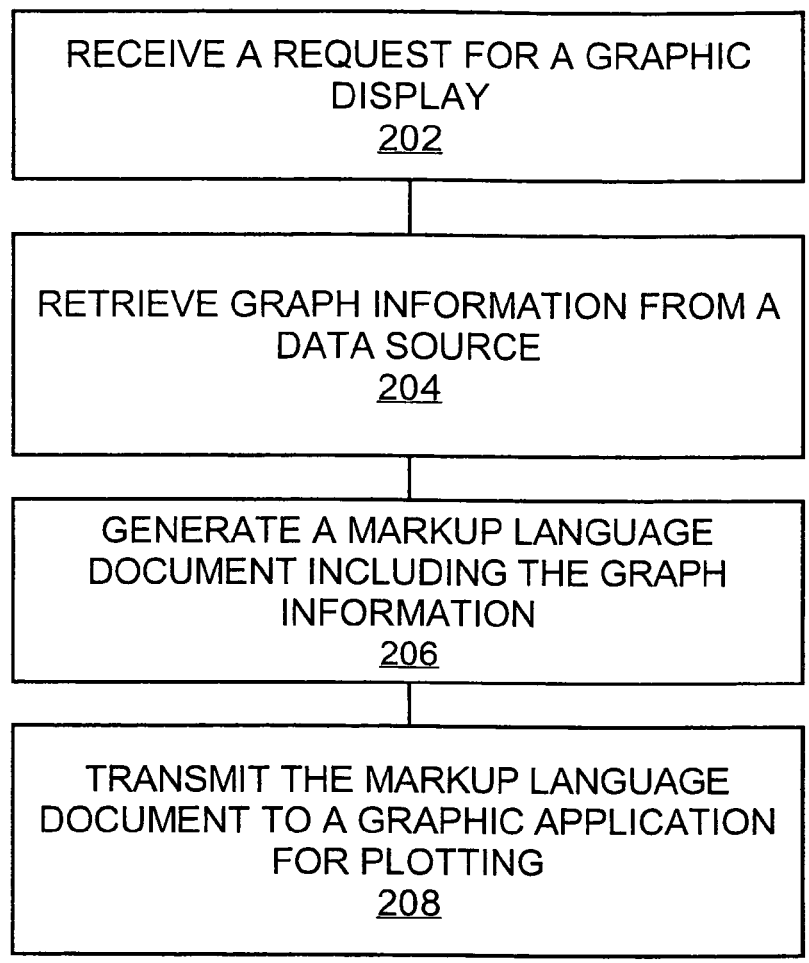
FIG. 2A is a flowchart illustrating steps at a server, for plotting a graph using a markup language.

FIG. 2A is a flowchart illustrating steps at a server, for plotting a graph using a markup language, according to one aspect of the invention and as generally described above in reference to FIG. 1. At step 202, a request for a graphic display is received. For example, prior to execution of the graphic application 106, a user enters a request for a graphic display through an interface, such as browser 104 (FIG. 1), which is transmitted to and received by a server, such as server 108 (FIG. 1). At step 204, graph information is retrieved from a data source. For example, server 108 retrieves graph information from database 110. At step 206, a markup language document is generated including the graph information and according to a DTD, and at step 208, the document is transmitted to a graphic application. For example, server 108 converts the graph information into the specified markup language format before transmitting to the graphic application 106.

Figure 2B:
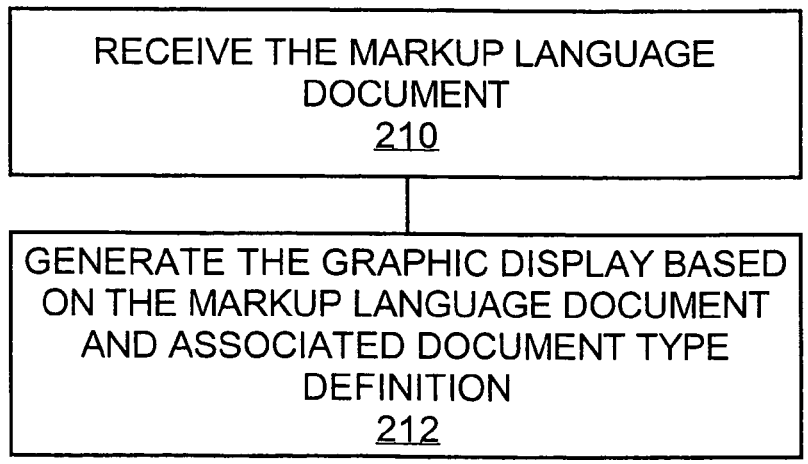
FIG. 2B is a flowchart illustrating steps at a client, for plotting a graph using a markup language.

FIG. 2B is a flowchart illustrating steps at a client, for plotting a graph using a markup language, according to one aspect of the invention and as generally described above in reference to FIG. 1. FIG. 2B continues the client-server process partially illustrated in FIG. 2A. At step 210, the markup language document is received. For example, graphic application 106 receives the document and associated DTD from server 108. The graphic application 106, utilizing the markup language document and DTD configured according to embodiments of the invention, can generate the requested graphic display, at step 212. For example, the graphic application 106 can generate the graphic display such that the requested focus entity is the primary graphical image of the plot, to which the other plotted entities are relationally configured.

Figure 5:
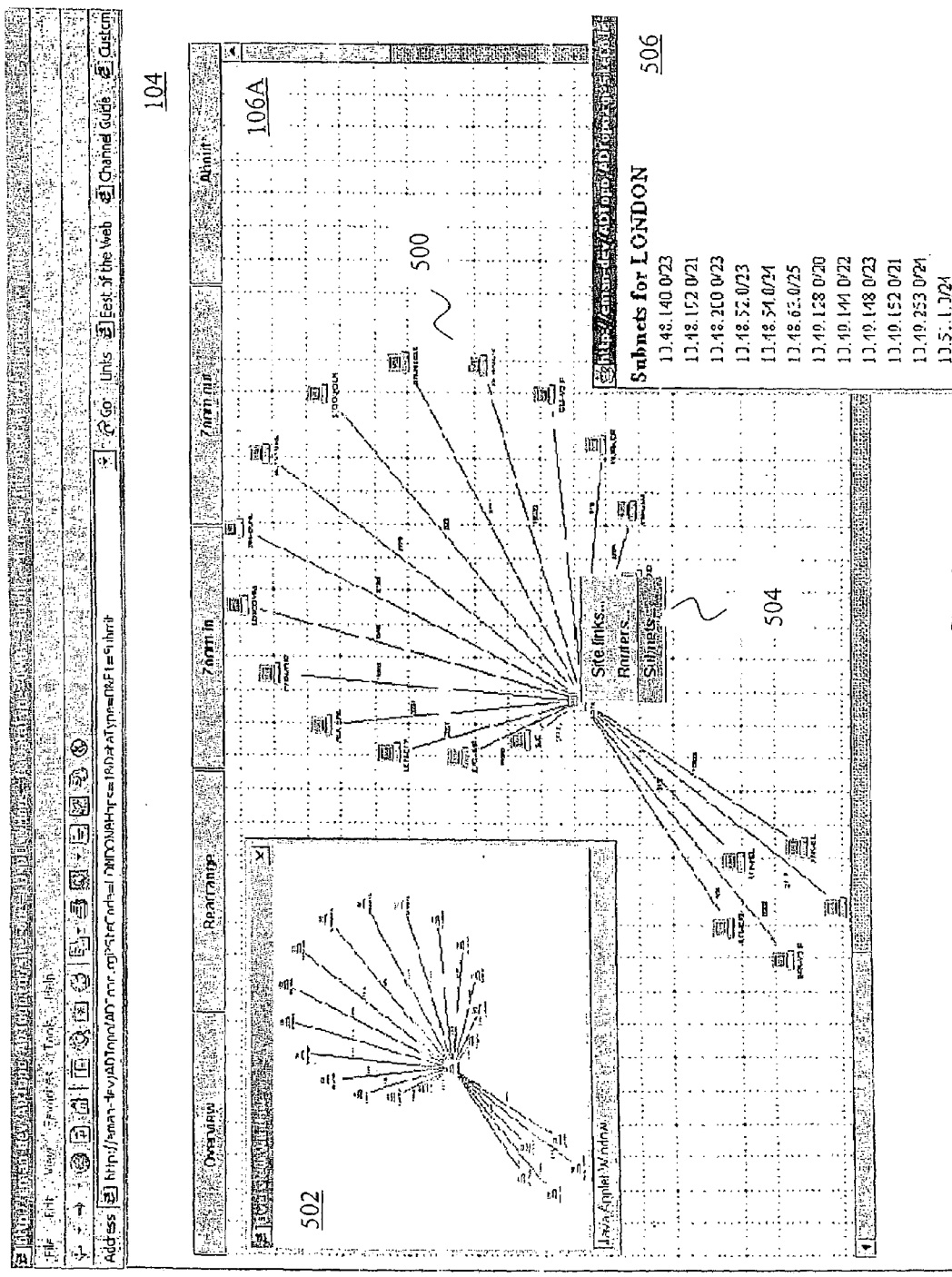
FIG. 5 is a printed screen display illustrating an example of an application window.

Graphic application 106 (FIG. 1) can plot the graphic information in multiple display arrangements. For example, in one arrangement, the focus entity is substantially centered on the display screen, while the related (or secondary) entities are graphically connected in a generally circular pattern, as depicted in FIG. 5. In another arrangement, the entities are configured in a hierarchical display, wherein the focus entity is substantially centered on the display screen with the related entities graphically connected in a tree. In this arrangement, the number of related entities in successive levels of the hierarchical graph increase in one direction and decrease in the other direction. This display arrangement resembles a conventional organization chart. In one embodiment, the size of the focus entity is related to the number of connected related entities.

In the method of FIGS. 2A and 2B, when a user wants to change the focus of the graph, only data related to the incremental portion of the graph is retrieved from the data source, and only the incremental, or new, data is processed for plotting and rendering. The information associated with the first plot is maintained in local memory of workstation 102 (FIG. 1) and the new data is processed, merged, and displayed with the first plot information, reconfigured such that the new focus entity is now substantially centered on the display screen with its connected entities. The first plot information is re-rendered, thus displaying on a different portion of the display screen, but the processing required to retrieve and re-plot the first graph information is not repeated. Therefore, processing resource utilization is minimized through incremental plotting of new graphic displays that are elaborations of a previous graphic display.

Methods for Plotting Network Topologies

Figure 3:
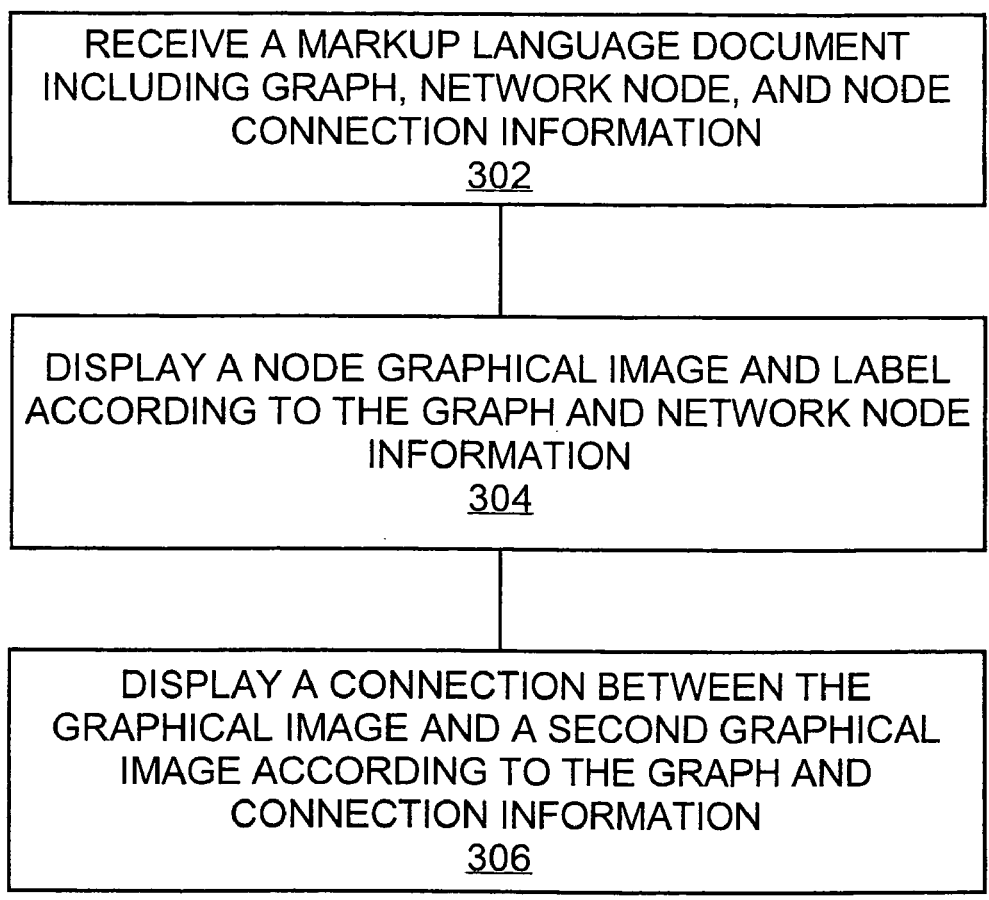
FIG. 3 is a flowchart illustrating steps for plotting a network topology using a markup language.

FIG. 3 is a flowchart illustrating steps for plotting a network topology, according to an aspect of the invention. The steps illustrated are typically performed subsequent to a user request for a topology plot and to retrieval of data related to the network illustrated in the requested topology plot, from a data source such as a network manager database.

At step 302, a markup language document is received, which includes graph information specifying display attributes for plotting the topology, network node information, and network node connection information. The components of the network node information and the node connection information are described in reference to FIG. 4. At step 304, a node graphical image, representing the focus node of interest, and an associated label are displayed according to the graph information and network node information. At step 306, a connection between the node graphical image and a second graphical image is displayed according to the graph information and connection information, wherein the second graphical image represents a second node connected to the first node by a network link. Steps 304 and 306 are not required to be separate steps or required to be performed in the order presented, for the display of both the node and connection information can occur simultaneously.

Markup Language Document Type Definition

Figure 4:
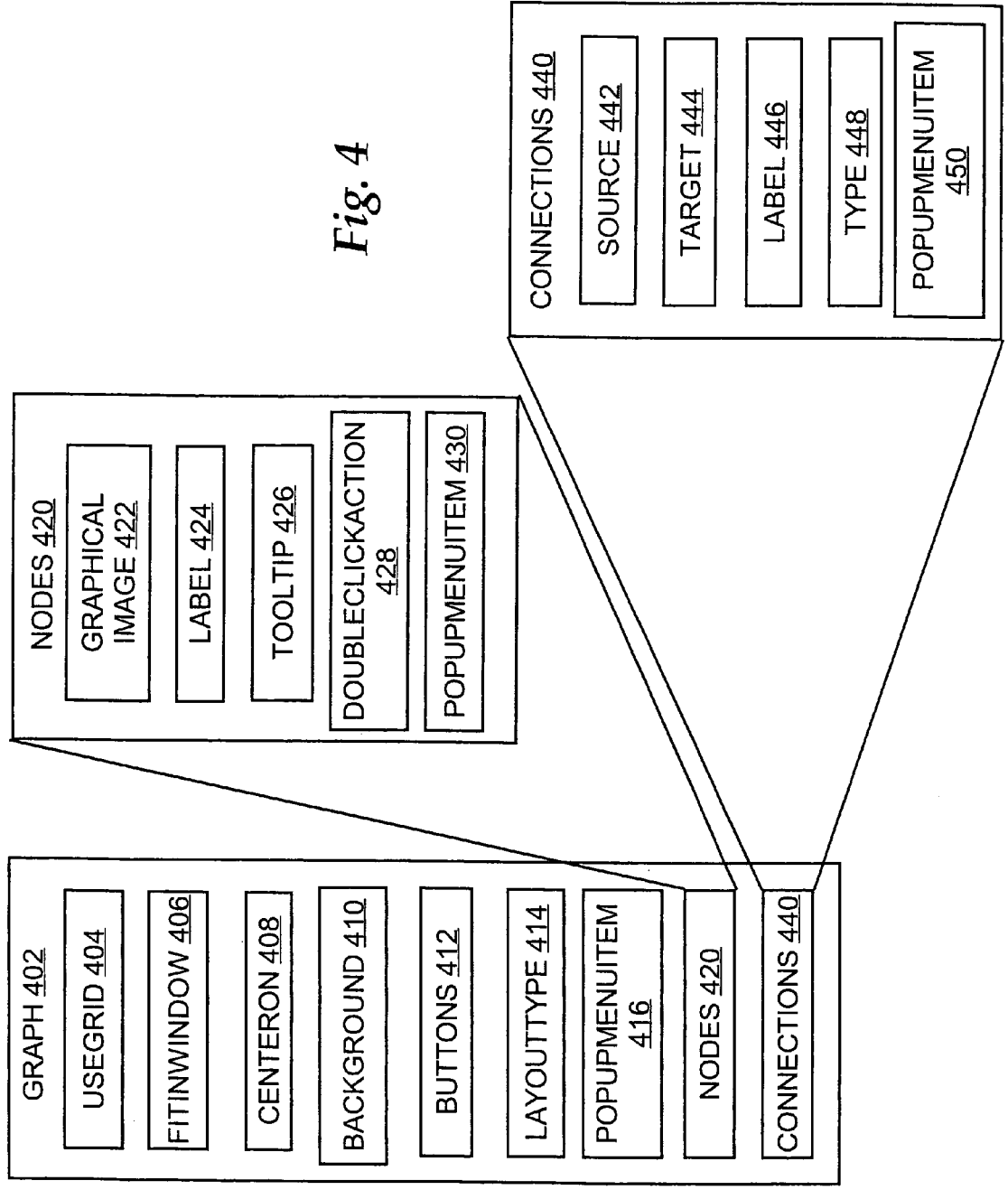
FIG. 4 is a block diagram illustrating components of a markup language document.

FIG. 4 is a block diagram illustrating components of a markup language document utilized in various aspects of the invention. Examples of markup language documents in accordance with embodiments of the invention are shown in Appendix B. In embodiments in which the ML document 114 (FIG. 1) is based on XML, these components are constituent to a document type definition (DTD) that defines the elements and/or attributes of the associated ML document 114. A visual representation of a DTD associated with ML document 114, in accordance with aspects of the invention, is included in Appendix A. Although the data structure illustrated in FIG. 4 can be utilized to plot multiple types of information, for example, network topologies, organization charts, project schedules, etc., via the processes illustrated in FIG. 2A and FIG. 2B, certain terms used in FIG. 4 (i.e., "nodes" and "connections") are applicable to the plotting of network topologies via the process illustrated in FIG. 3. Use of the terms "nodes" and "connections" does not limit embodiments solely to the techniques for plotting network topologies, but are used for illustrative purposes. In addition, the term "edges" is used as a synonym for "connections," and the term "icon" (or an abbreviation thereof) may be used for "graphical image."

One component, or element, of the markup language document is graph information 402. Graph information 402 is used to specify various display elements and their attributes which are used to plot a graph. In one specific embodiment, graph information 402 includes UseGrid 404, FitInWindow 406, CenterOn 408, Background 410, Buttons 412, LayoutType 414, PopupMenuItem 416, Nodes 420, and Connections 440. Elements and attributes of Nodes 420 and Connections 440 are illustrated in detail blocks of FIG. 4.

UseGrid 404 is an element used for indicating whether the requested graphic display includes grid lines, and its attribute is set as true or false. FitInWindow 406 is an element used for centering the graphic display on the display screen of workstation 102 (FIG. 1), and its attribute is set to true or false. CenterOn 408 is an element used for indicating whether an image of the graphic display should be substantially centered on the display screen of workstation 102, with values indicating whether to center the focus entity, or node, or to center the entire graphic display (such as in FitInWindow 406). If CenterOn 408 is set to center on a node, then FitInWindow must be set as false.

Background 410 is an element with attributes indicating an image to display as background for the requested graphic display. An URL is used as an attribute value to direct the graphic application 106 (FIG. 1) to the desired image resource for displaying as the background of application window 106a (FIG. 1). Any standard image can be used, for example, a gif, jpeg, or bmp image file. Another attribute value is used to indicate the desired color of the background, and in one embodiment the color is be represented as a hexadecimal number. Another attribute value is used to indicate the center coordinates of the background image, if an image is used. PopupMenuItem 416 is an element used for specifying a popup menu of one or more functions that is displayed upon a user interaction with the background of application window 106a. Examples of interactions that may trigger the display of the popup menu are a mouse click, double click, or right click. Choosing a function from the popup menu, through a click action, initiates execution of the respective function.

Button 412 is an element used for defining toolbar buttons that are displayed by the graphic application 106 in the application window 106*a* (FIG. 1). Examples of buttons, as illustrated in FIG. 5, are "Overview," "Rearrange," "Zoom in," "Zoom out," and "About." Button 412 provides display features that can be utilized to affect the view displayed in the graphic window 106*a*, and its attributes include label values for displaying in association with the button functions.

LayoutType 414 is an element used for specifying the display arrangement to be plotted in the application window 106*a*. Examples of display arrangements are a circular arrangement, which substantially centers the focus entity or node of interest with connected entities or nodes configured in a circular arrangement with the focus entity (as illustrated in the main graphic display 500 and the overview window 504 of FIG. 5), a hierarchical arrangement as described above and resembling a typical organization chart, and an orthogonal arrangement.

Nodes 420 is an element used to define the nodes, or entities, of the requested graphic display, and includes graphical image 422 and label 424 attributes for specifying a graphical image, or image, and an associated label for each node plotted in the graphic display. In addition, node 420 includes Tooltip 426, DoubleClickAction 428, and PopupMenuItem 430, each specifying a function to call, upon a user interaction with a displayed graphical image.

An example use of a tooltip 426 is to open, upon a user placing a computer mouse or similar pointer device over the graphical image, a small text window displaying text associated with the node or entity represented by the graphical image.

An example use of a DoubleClickAction 428 is to change the display, upon a user double-clicking the left button of a computer mouse or similar pointer device on the graphical image, such that the focus entity of the plotted display is the graphical image which was double-clicked. In an embodiment typified by this example, the function can make the graphical image that was double-clicked the focus entity substantially centered on the display screen, with the entities connected to the new focus entity displayed as connected. The graphic application 106 (FIG. 1) and ML document 114 (FIG. 1) are configured such that: (1) only the data related to the incremental portion of the plot is retrieved from the data source, such as database 110 (FIG. 1); and (2) only the incremental, or new, data is processed for plotting, i.e., the information associated with the first plot is maintained in local memory of workstation 102 (FIG. 1) and the new data is processed and displayed along with the first plot information (reconfigured such that the new focus entity is now substantially centered on the display screen with its connected entities). The first plot information can be re-rendered, thus displaying on a different portion of the display screen, but the processing required to plot the first graphic display (e.g., determining optimal placement of graphical images and defining the coordinates associated with the graphical images and connections on the display screen, and implementing other attributes defined in the graphic information underlying the first plot information) is not repeated. Therefore, processing resource utilization is minimized through incremental plotting of new graphic displays that are elaborations of a previous graphic display.

An example use of a PopupMenuItem 430 is to display, upon a user clicking the right button of a computer mouse or similar pointer device on the graphical image, a popup menu that presents one or more functions that can be executed by choosing the respective menu item. An example of a popup menu is illustrated in FIG. 5 as menu 504. The PopupMenuItem 430 element allows one to specify the popup function labels to display, as well as the ClickAction command that links to and provides information to an appropriate function application through a URL (as shown in the sample ML documents of Appendix B). Popup menu 504 depicts functions that facilitate the retrieval of data from a data source, such as database 110 (FIG. 1); opening a separate window, such as window 506; returning the data in a suitable format, such as HTML or XML; and displaying the information in the window 506. The example presented in window 506 is directed toward subnet data associated with the focus entity ("London"), but as presented in popup menu 504, site link data or router data associated with the focus entity can also be displayed in the window 506. As is the case with the Button 412, PopUpMenuItems 416, 430, and 450, Tooltip 426, and DoubleClickAction 428, these elements can be changed by a user by modifying the attributes described in the ML document 114 (FIG. 1).

Connections 440 is an element used to define the edges (or connections) between the nodes (or focus entities) of the requested graphic display, and includes a Source 442 attribute and a Target 444 attribute to specify the source and target nodes/entities. Connections 440 include Label 446 for specifying a label for each connection plotted in the graphic display. In embodiments wherein network topologies are plotted, the label can be used to present a cost parameter that reflects the bandwidth of the real network link represented by the connection. In addition, connections 440 include Type 448 and PopUpMenuItem 450 attributes. PopUpMenuItem 450 functions similarly to like functions described above (416 and 430), but in relation to connections instead of nodes or the background. Type 448 is an element used to specify the type of connection to depict in the graphic display. Examples of types are one or two way arrowed connections or no arrows on the connection.

Graphic Display Examples

FIG. 5 is a diagram of a screen display illustrating an example of an application window. FIG. 5 depicts a web browser 104 window, with the application window 106*a* inset within the browser 104 window. A graphic display 500 is illustrated on a background with grids on. Overview window 502 is shown inset within application window 106*a*. The overview window 502 can be opened by using the "Overview" button 512, which is described in reference to the Button 412 element of FIG. 4. In this example, the overview window 502 presents a view of a circular arrangement for the entire network topology currently plotted, having London as the focus node.

Popup menu 504 is shown inset within application window 106*a*. The popup menu 504 can be opened by right clicking a mouse or other pointer device on a node; in this case, the London focus node. In this example, the popup menu function is accessed through operation of the PopUpMenuItem 430 element associated with Nodes 420 of FIG. 4. The PopUpMenuItem 430 element allows one to specify the popup function labels to display, as well as the ClickAction command that links to and provides information to an appropriate function application through a URL (as shown in the sample ML documents of Appendix B). Execution of a popup menu function retrieves the relevant data from a data source, returns the data in a specified file type, and opens a window for displaying the information requested through the popup menu function.

Figure 6:
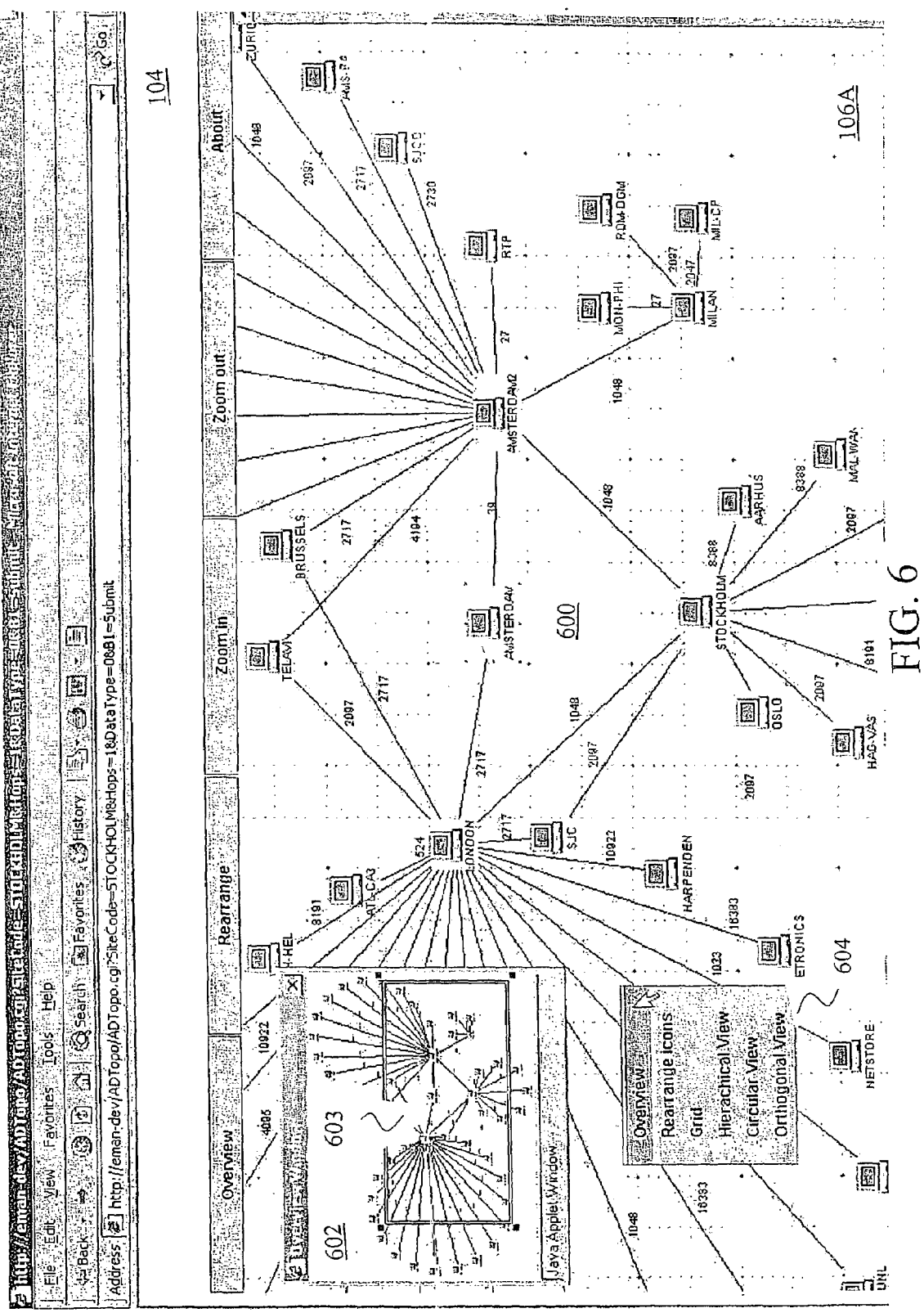
FIG. 6 is a printed screen display illustrating another example of an application window.

FIG. 6 is a diagram of a screen display illustrating another example of an application window. FIG. 6 depicts a web browser 104 window, with the application window 106*a* inset within the browser 104 window. A graphic display 600 is illustrated on a background with grids on. Overview window 602 is shown inset within application window 106*a*.

In this example, the overview window 602 can be opened by using the popup menu function "Overview," shown in popup menu 604. In this example, the popup menu 604 can be opened by right clicking a mouse or other pointer device on the background. Furthermore, the popup menu function is accessed through operation of the PopUpMenuItem 416 element associated with graph 402 of FIG. 4, which is used similarly to PopUpMenuItem 430 described in reference to FIG. 5.

In the example of FIG. 6, the overview window 602 presents a view of multiple circular arrangements for the entire network topology currently plotted. The background overview function depicted in overview window 602 presents a display frame 603 that can be manipulated with a mouse or other pointer device, in order to affect the main graphic display 600. The portion of the graphic display shown in overview window 602 that is encapsulated within the display frame 603, is the portion of the graphic display 600 that is shown in the main display area of application window 106a. User interaction with the display frame 603 results in real-time changes to the main graphic display 600. Other display arrangements (e.g., "Hierarchical View," "Circular View," and "Orthogonal View") that are available to a user are also shown in popup menu 604.

FIGS. 5 and 6 present examples of uses of embodiments of the invention, for illustrative purposes only. These examples are not to be interpreted as limiting the scope of the invention.

Implementation Mechanisms

Implementations of the invention are described throughout this specification, and, for purposes of clarity and context, in locations that best facilitate understanding the context of the implementations. In one specific implementation, an ML document such as ML document 114 (FIG. 1 and FIG. 4) is based on XML. In one specific implementation, the foregoing processes depicted in FIGS. 2 and 3 are implemented using the Java programming language. In addition, embodiments may be implemented in one or more software elements.

Hardware Overview

Figure 7:
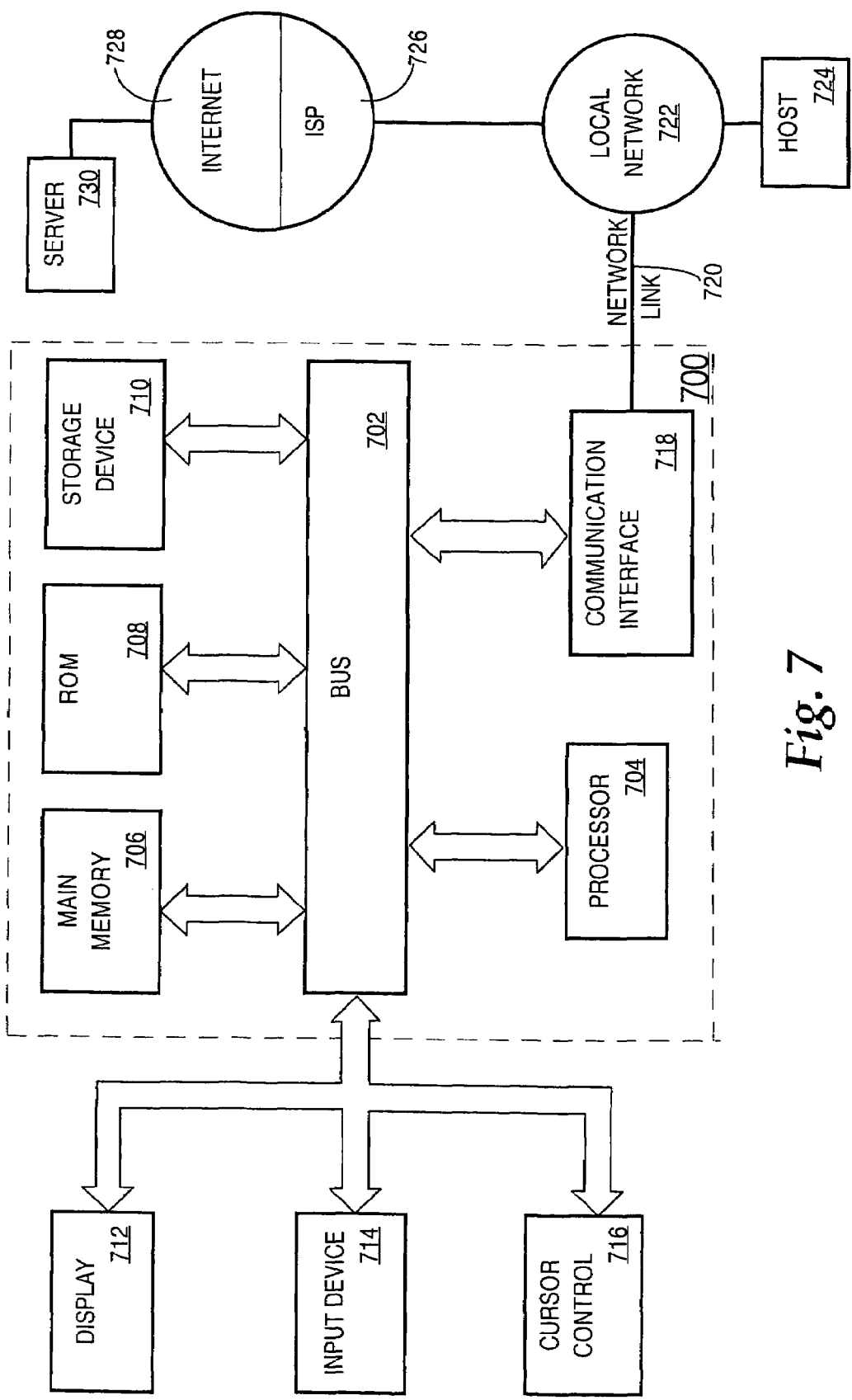
FIG. 7 is a block diagram that illustrates a computer system upon which an embodiment of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory ("RAM") or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory ("ROM") 708 or other static storage device coupled to bus 702 for storing static information and instructions for processor 704. A storage device 710, such as a magnetic disk, optical disk, or magneto-optical disk, is provided and coupled to bus 702 for storing information and instructions.

Computer system 700 may be coupled via bus 702 to a display 712, such as a cathode ray tube ("CRT") or a liquid crystal display ("LCD"), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for plotting graphs using a markup language. According to embodiments of the invention, plotting network topologies or other graphs is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical, magnetic, or magneto-optical disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network ("ISDN") card or a modem to provide a data communication connection to a corresponding type of telephone line. As another example, communication interface 718 may be a local area network ("LAN") card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider ("ISP") 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for automatically generating a replication topology for a directory service as described herein.

Processor 704 may execute the received code as it is received, and/or stored in storage device 710, or other non-volatile storage for later execution. In this manner, computer system 700 may obtain application code in the form of a carrier wave.

Extensions and Alternatives

Alternative embodiments of the invention are described throughout this specification, and, for purposes of clarity and context, in locations that best facilitate understanding the context of the embodiments.

One specific extension comprises an embodiment in which the markup language document includes additional tags for removing specified nodes and connections from a graphic display, and for clearing the entire graphic display from the display screen.

In the foregoing description, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

In addition, in this description, certain process steps are set forth in a particular order, and alphabetic and alphanumeric labels may be used to identify certain steps. Unless specifically stated in the description, embodiments of the invention are not limited to any particular order of carrying out such steps. In particular, the labels are used merely for convenient identification of steps, and are not intended to imply, specify or require a particular order of carrying out such steps.

APPENDIX A

`\\cassio-7020\c$\Data\projects\Java\AppletTest\TopoML.dtd`  
03/06/01 15:42:09

| Element | | | | | | |
|---|---|---|---|---|---|---|
| XML | | | | | | |
| | = version | 1.0 | | | | |
| | = encoding | UTF-8 | | | | |
| ◊- Comment | edited with XML Spy v3.5 NT (http://www.xmlspy.com) by Cassio Goldschmidt (Cisco Systems) | | | | | |
| PopupMenuItems *1 or more sequence of* | | | | | | |
| | PopupMenuItem | 1 or more | | | | |
| PopupMenuItem *1 or more sequence of* | | | | | | |
| | ClickAction | 1 or more | | | | |
| ClickAction | EMPTY | | | | | |
| ClickAction *attribute list* | | | | | | |
| | Name | Type | Values | | Presence | Default |
| | 1 command | CDATA | | | #REQUIRED | |
| | 2 type | Choice | Values | | #REQUIRED | |
| | | | | Text | | |
| | | | | 1 HTML | | |
| | | | | 2 XML | | |
| | | | | 3 TOPO | | |
| DoubleClickActi... | EMPTY | | | | | |
| DoubleClickAction *attribute list* | | | | | | |
| | Name | Type | Values | | Presence | Default |
| | 1 command | CDATA | | | #REQUIRED | |
| | 2 type | Choice | Values | | #REQUIRED | |
| | | | | Text | | |
| | | | | 1 HTML | | |
| | | | | 2 XML | | |
| | | | | 3 TOPO | | |
| ◊- Comment | useGrid: deault is false | | | | | |
| useGrid | EMPTY | | | | | |
| ◊- Comment | fitInWindow (default is true) | | | | | |
| fitInWindow | EMPTY | | | | | |
| ◊- Comment | background: default is white without pictures | | | | | |
| background | EMPTY | | | | | |
| ◊- Comment | | | | | | |
| ◊- Comment | This is the main element - the root of everythign else | | | | | |
| graph *0 or more choice of* | | | | | | |
| | useGrid | 0 or 1 | | | | |
| | fitInWindow | 0 or 1 | | | | |
| | centerOn | 0 or 1 | | | | |
| | background | 0 or 1 | | | | |
| | buttons | 0 or 1 | | | | |
| | layoutType | 0 or 1 | | | | |
| | PopupMenuIte... | 0 or 1 | | | | |
| | nodes | 0 or 1 | | | | |
| | edges | 0 or 1 | | | | |
| useGrid *attribute list* | | | | | | |
| | Name | Type | Values | | Presence | Default |
| | 1 set | Choice | Values | | #REQUIRED | |
| | | | | Text | | |
| | | | | 1 true | | |
| | | | | 2 false | | |
| ◊- Comment | fitInWindow, by definition, also means center graph | | | | | |
| fitInWindow *attribute list* | | | | | | |
| | Name | Type | Values | | Presence | Default |
| | 1 set | Choice | Values | | #REQUIRED | |
| | | | | Text | | |
| | | | | 1 true | | |
| | | | | 2 false | | |
| ◊- Comment | CenterOn Values: graph, node, none if node is choosen, fitInWindow must be false (default is none) | | | | | |
| centerOn | #PCDATA | | | | | |
| ◊- Comment | Img ="null" means clean-up current img, otherwise use Img= a URL. color is a color entry in Hexadecimal (e.g. FFFFFF for white, FF0000 for red). center is a comma separated x,y coordinate. | | | | | |
| background *attribute list* | | | | | | |
| | Name | Type | Values | | Presence | Default |
| | 1 img | CDATA | | | #REQUIRED | |
| | 2 color | CDATA | | | #IMPLIED | |
| | 3 center | CDATA | | | #IMPLIED | |
| ◊- Comment | layoutType can be Circular, Hierachical, Orthogonal and ... (default is none) | | | | | |
| layoutType | #PCDATA | | | | | |
| ◊- Comment | | | | | | |
| ◊- Comment | Definition of node and nodes | | | | | |
| nodes *1 or more sequence of* | | | | | | |
| | node | | | | | |
| node *0 or more choice of* | | | | | | |
| | tooltip | 0 or 1 | | | | |
| | location | 0 or 1 | | | | |
| | DoubleClickActi... | 0 or 1 | | | | |
| | PopupMenuIte... | 0 or 1 | | | | |
| node *attribute list* | | | | | | |
| | Name | Type | Values | | Presence | Default |
| | 1 label | CDATA | | | #REQUIRED | |
| | 2 img | CDATA | | | #REQUIRED | |
| ◊- Comment | | | | | | |
| ◊- Comment | Definition of toolbar buttons | | | | | |
| buttons *1 or more sequence of* | | | | | | |
| | button | | | | | |
| button *1 or more sequence of* | | | | | | |
| | tooltip | 0 or 1 | | | | |
| | ClickAction | 1 or more | | | | |

| | | tooltip | 0 or 1 | | | | |
|---|---|---|---|---|---|---|---|
| button attribute list | | | | | | | |
| | | Name | Type | Values | Presence | Default | |
| | 1 | label | CDATA | | #REQUIRED | | |
| Comment | | A tooltip for the node/button | | | | | |
| tooltip | | #PCDATA | | | | | |
| Comment | | The x,y location for a node | | | | | |
| location | | #PCDATA | | | | | |
| Comment | | | | | | | |
| Comment | | Definition of edges and edge | | | | | |
| edges 1 or more sequence of | | | | | | | |
| | | edge | 1 or more | | | | |
| edge 0 or more choice of | | | | | | | |
| | | label | 0 or 1 | | | | |
| | | color | 0 or 1 | | | | |
| | | type | 0 or 1 | | | | |
| | | PopupMenuIte... | 0 or 1 | | | | |
| edge attribute list | | | | | | | |
| | | Name | Type | Values | Presence | Default | |
| | 1 | source | CDATA | | #REQUIRED | | |
| | 2 | target | CDATA | | #REQUIRED | | |
| Comment | | Edge's label, default is none | | | | | |
| label | | #PCDATA | | | | | |
| Comment | | Edge's color in Hexadecimal (e.g 000000 is black, 00FF00 is green), default is black | | | | | |
| color | | #PCDATA | | | | | |
| Comment | | Type: A number that represents the edge to be used: 1=One way arrowed edge, 2=One way reversed arrowed edge, 3=double arrow edge (both directions), 4=no arrows (default) | | | | | |
| type | | #PCDATA | | | | | |

APPENDIX B

```xml
<?xml version='1.0'?>
<graph>
    <!-- fitInWindow, by definition, also means center graph -->
    <fitInWindow set="false"/>
    <!-- CenterOn Values: graph, node, none
    if node is choosen, fitInWindow must be false -->
    <centerOn>node</centerOn>
    <Nodes>
        <node label="ATHENS" img="http://eman-dev/AppletTest/Images/32x32-
        end_station_blue.gif">
            <tooltip>ATHENS</tooltip>
            <DoubleClickAction command="http://eman-
            dev/ADTopo/ADTopo.cgi?SiteCode=ATHENS&Hops=1&DataTyp
            e=1" type="XML"/>
            <PopupMenuItems>
                <PopupMenuItem label="Site links...">
                    <ClickAction command="http://eman-
                    dev/ADTopo/ADTopo.cgi?SiteCode=ATHENS&Hops=1
                    &DataType=3" type="HTML"/>
                </PopupMenuItem>
                <PopupMenuItem label="Routers...">
                    <ClickAction command="http://eman-
                    dev/ADTopo/ADTopo.cgi?SiteCode=ATHENS&Hops=1
                    &DataType=2" type="HTML"/>
                </PopupMenuItem>
                <PopupMenuItem label="Subnets...">
                    <ClickAction command="http://eman-
                    dev/ADTopo/ADTopo.cgi?SiteCode=ATHENS&Hops=1
                    &DataType=4" type="HTML"/>
                </PopupMenuItem>
            </PopupMenuItems>
        </node>
        <node label="BIRMINGHAM" img="http://eman-
        dev/AppletTest/Images/32x32-end_station_blue.gif">
            <tooltip>BIRMINGHAM</tooltip>
            <DoubleClickAction command="http://eman-
            dev/ADTopo/ADTopo.cgi?SiteCode=BIRMINGHAM&Hops=1&Dat
            aType=1" type="XML"/>
            <PopupMenuItems>
                <PopupMenuItem label="Site links...">
                    <ClickAction command="http://eman-
                    dev/ADTopo/ADTopo.cgi?SiteCode=BIRMINGHAM&Ho
                    ps=1&DataType=3" type="HTML"/>
                </PopupMenuItem>
                <PopupMenuItem label="Routers...">
                    <ClickAction command="http://eman-
                    dev/ADTopo/ADTopo.cgi?SiteCode=BIRMINGHAM&Ho
                    ps=1&DataType=2" type="HTML"/>
                </PopupMenuItem>
                <PopupMenuItem label="Subnets...">
                    <ClickAction command="http://eman-
                    dev/ADTopo/ADTopo.cgi?SiteCode=BIRMINGHAM&Ho
                    ps=1&DataType=4" type="HTML"/>
```

```xml
            </PopupMenuItem>
        </PopupMenuItems>
</node>
<node label="BRENTWOOD" img="http://eman-
dev/AppletTest/Images/32x32-end_station_blue.gif">
        <tooltip>BRENTWOOD</tooltip>
        <DoubleClickAction command="http://eman-
        dev/ADTopo/ADTopo.cgi?SiteCode=BRENTWOOD&Hops=1&Data
        Type=1" type="XML"/>
        <PopupMenuItems>
                <PopupMenuItem label="Site links...">
                        <ClickAction command="http://eman-
                        dev/ADTopo/ADTopo.cgi?SiteCode=BRENTWOOD&Hop
                        s=1&DataType=3" type="HTML"/>
                </PopupMenuItem>
                <PopupMenuItem label="Routers...">
                        <ClickAction command="http://eman-
                        dev/ADTopo/ADTopo.cgi?SiteCode=BRENTWOOD&Hop
                        s=1&DataType=2" type="HTML"/>
                </PopupMenuItem>
                <PopupMenuItem label="Subnets...">
                        <ClickAction command="http://eman-
                        dev/ADTopo/ADTopo.cgi?SiteCode=BRENTWOOD&Hop
                        s=1&DataType=4" type="HTML"/>
                </PopupMenuItem>
        </PopupMenuItems>
</node>
<node label="MPH-CS1" img="http://eman-
dev/AppletTest/Images/32x32-end_station_blue.gif">
        <tooltip>MPH-CS1</tooltip>
        <DoubleClickAction command="http://eman-
        dev/ADTopo/ADTopo.cgi?SiteCode=MPH-
        CS1&Hops=1&DataType=1" type="XML"/>
        <PopupMenuItems>
                <PopupMenuItem label="Site links...">
                        <ClickAction command="http://eman-
                        dev/ADTopo/ADTopo.cgi?SiteCode=MPH-
                        CS1&Hops=1&DataType=3" type="HTML"/>
                </PopupMenuItem>
                <PopupMenuItem label="Routers...">
                        <ClickAction command="http://eman-
                        dev/ADTopo/ADTopo.cgi?SiteCode=MPH-
                        CS1&Hops=1&DataType=2" type="HTML"/>
                </PopupMenuItem>
                <PopupMenuItem label="Subnets...">
                        <ClickAction command="http://eman-
                        dev/ADTopo/ADTopo.cgi?SiteCode=MPH-
                        CS1&Hops=1&DataType=4" type="HTML"/>
                </PopupMenuItem>
        </PopupMenuItems>
</node>
<node label="RTP" img="http://eman-dev/AppletTest/Images/32x32-
end_station_blue.gif">
        <tooltip>RTP</tooltip>
        <DoubleClickAction command="http://eman-
        dev/ADTopo/ADTopo.cgi?SiteCode=RTP&Hops=1&DataType=1
        " type="XML"/>
```

```xml
            <PopupMenuItems>
                <PopupMenuItem label="Site links...">
                    <ClickAction command="http://eman-
                    dev/ADTopo/ADTopo.cgi?SiteCode=RTP&Hops=1&am
                    p;DataType=3" type="HTML"/>
                </PopupMenuItem>
                <PopupMenuItem label="Routers...">
                    <ClickAction command="http://eman-
                    dev/ADTopo/ADTopo.cgi?SiteCode=RTP&Hops=1&am
                    p;DataType=2" type="HTML"/>
                </PopupMenuItem>
                <PopupMenuItem label="Subnets...">
                    <ClickAction command="http://eman-
                    dev/ADTopo/ADTopo.cgi?SiteCode=RTP&Hops=1&am
                    p;DataType=4" type="HTML"/>
                </PopupMenuItem>
            </PopupMenuItems>
        </node>
        <node label="ATLANTA" img="http://eman-
        dev/AppletTest/Images/32x32-end_station_blue.gif">
            <tooltip>ATLANTA</tooltip>
            <DoubleClickAction command="http://eman-
            dev/ADTopo/ADTopo.cgi?SiteCode=ATLANTA&Hops=1&DataTy
            pe=1" type="XML"/>
            <PopupMenuItems>
                <PopupMenuItem label="Site links...">
                    <ClickAction command="http://eman-
                    dev/ADTopo/ADTopo.cgi?SiteCode=ATLANTA&Hops=
                    1&DataType=3" type="HTML"/>
                </PopupMenuItem>
                <PopupMenuItem label="Routers...">
                    <ClickAction command="http://eman-
                    dev/ADTopo/ADTopo.cgi?SiteCode=ATLANTA&Hops=
                    1&DataType=2" type="HTML"/>
                </PopupMenuItem>
                <PopupMenuItem label="Subnets...">
                    <ClickAction command="http://eman-
                    dev/ADTopo/ADTopo.cgi?SiteCode=ATLANTA&Hops=
                    1&DataType=4" type="HTML"/>
                </PopupMenuItem>
            </PopupMenuItems>
        </node>

</Nodes>
<Edges>
    <edge source="ATLANTA" target="ATHENS">
        <label>2717</label>
    </edge>
    <edge source="ATLANTA" target="BIRMINGHAM">
        <label>32767</label>
    </edge>
    <edge source="ATLANTA" target="BRENTWOOD">
        <label>10922</label>
    </edge>
    <edge source="ATLANTA" target="MPH-CS1">
        <label>10922</label>
    </edge>
```

```xml
            <edge source="ATLANTA" target="RTP">
                <label>2716</label>
            </edge>

</Edges>
</graph>
```

```xml
<?xml version='1.0'?>
<graph>
    <useGrid set="false"/>
    <!-- fitInWindow, by definition, also means center graph -->
    <fitInWindow set="true"/>
    <!-- CenterOn Values: graph, node, none
        if node is choosen, fitInWindow must be false -->
    <centerOn>graph</centerOn>
    <!-- Img ="null" means clean-up current img -->
    <!-- <background color="FFFFFF" img="http://cassio-
       7020/AppletTest/Images/32x32-end_station_yellow.gif"
       style="IMAGE_TILE"/> -->
    <!-- <background color="00F000" img="null"/> -->
    <background img="http://cassio-7020/AppletTest/Images/32x32-
     end_station_yellow.gif" center="10,10"/>
    <!-- <layoutType>Hierarchical</layoutType> -->
    <layoutType>Hierarchical</layoutType>
      <nodes>
            <node label="Node on the Fly" img="http://cassio-
            7020/AppletTest/Images/32x32-end_station_red.gif">
            <tooltip>Behold!!!!</tooltip>
            <location>50,100</location>
            </node>
            <node label="More Node on the Fly" img="http://cassio-
            7020/AppletTest/Images/32x32-end_station_yellow.gif">
                <!-- No tooltip -->
            <select/>
            </node>
            <node label="Unknown node" img="http://cassio-
            7020/AppletTest/Images/32x32-end_station_blue.gif">
                <!-- I just changed the icon of an existing node -->
            </node>
      </nodes>
      <edges>
        <!-- Edge types:
            1: one way arrow
            2: reverse arrow
            3: two arrows
            4: no arrows -->
            <edge source="Node on the Fly" target="Unknown node">
                <label>A new Label...</label>
                <color>0000FF</color>
                <!-- No edge type -->
            </edge>
            <edge source="Node on the Fly" target="More Node on the Fly">
                <!-- No label -->
                <color>00FF00</color>
```

```
                <type>3</type>
            </edge>
        </edges>
</graph>
```

What is claimed is:

1. A method for plotting a graph using a markup language, comprising the steps of:
    receiving a request to generate a display of a graph comprising nodes connected by links, wherein the request identifies a first focus entity;
    retrieving, from a data source, first graph information describing the first focus entity and first nodes and links that are connected to the first focus entity;
    creating a first markup language document that contains the first graph information and which, when rendered in a display, causes plotting the first focus entity and first nodes and links that are connected to the first focus entity;
    receiving a request to change the display to focus on a second focus entity;
    retrieving second graph information describing only second nodes and links that are connected to the second focus entity, without repeating retrieving the first graph information;
    creating a second markup language document that contains only the second graph information and which causes, when only the second markup language document is rendered in the display, plotting both the first focus entity and the second focus entity without repeated rendering of the first markup language document.

2. The method of claim 1 wherein the rendering the first markup language document causes plotting the first focus entity in a first location in the display, and wherein rendering the second markup language document causes plotting the first focus entity in a different location of the display and plotting the second focus entity in the first location.

3. The method of claim 1 wherein creating the first markup language document comprises creating image information specifying a graphical image representing a focus entity for plotting in the first graphic display; label information specifying a label associated with the graphical image for plotting in the first graphic display; connection information specifying one or more connections between the graphical image and one or more secondary graphical images.

4. The method of claim 3 wherein creating the first markup language document further comprises creating one or more of tool tip information specifying information to display on the display device upon a first interaction with the graphical image; click action information specifying an action to perform upon a second interaction with the graphical image; menu information for specifying a menu to display on the display device upon a third interaction with the graphical image.

5. The method of claim 1 wherein creating the first markup language document further comprises creating menu information specifying a menu to display on the display device upon a first interaction with the one or more connections.

6. A method for displaying a network topology, comprising the steps of:
    generating and sending a request to generate a display of a graph comprising nodes connected by links, wherein the request identifies a first focus entity;
    receiving a first markup language document that contains first graph information based on a data source and describing first nodes and links that are connected to the first focus entity;
    rendering the first markup language in a display device, resulting in plotting the first focus entity and the first nodes and links;
    generating and sending a request to change the display device to focus on a second focus entity;
    receiving a second markup language document that contains only second graph information based on the data source and describing second nodes and links associated with the second focus entity;
    rendering only the second markup language document in the display device by processing the second graph information and merging the second graph information with the first graph information, resulting in plotting both the first focus entity and the second focus entity without repeating rendering of the first markup language document.

7. The method of claim 6 wherein rendering the first markup language document further comprises plotting one or more of tool tip information specifying information to display on the display device upon a first interaction with the graph; click action information for specifying an action to perform upon a second interaction with the graph; and menu information specifying a menu to display on the display device upon a third interaction with the graph.

8. The method of claim 7 wherein selecting a menu option in the menu causes displaying information about one or more links between the first focus entity and one or more of the nodes that are connected to the first focus entity.

9. The method of claim 7 wherein selecting a menu option in the menu causes displaying information about one or more routers associated with the first focus entity.

10. The method of claim 7 wherein selecting a menu option in the menu causes displaying information about one or more subnetworks associated with the first focus entity.

11. The method of claim 7 wherein plotting the first focus entity further comprises displaying connection label information specifying a label associated with a connection that includes a cost parameter that reflects bandwidth of the connection.

12. The method of claim 11 wherein the connection label information comprises a menu that is displayed in response to a user interaction with the connection.

13. A computer-readable medium carrying one or more sequences of instructions for plotting a graph using a markup language, wherein execution of the one or more sequences of instructions by one or more processors causes the one or more processors to perform:
    receiving a request to generate a display of a graph comprising nodes connected by links, wherein the request identifies a first focus entity;
    retrieving, from a data source, first graph information describing the first focus entity and first nodes and links that are connected to the first focus entity;
    creating a first markup language document that contains the first graph information and which, when rendered in a display, causes plotting the first focus entity and first nodes and links that are connected to the first focus entity;
    receiving a request to change the display to focus on a second focus entity;
    retrieving second graph information describing only second nodes and links that are connected to the second focus entity, without repeating retrieving the first graph information;
    creating a second markup language document that contains only the second graph information and which causes, when only the second markup language document is rendered in the display, plotting both the first focus entity and the second focus entity without repeated rendering of the first markup language document.

14. The computer-readable medium of claim 13 wherein the rendering the first markup language document causes plotting the first focus entity in a first location in the display, and wherein rendering the second markup language document causes plotting the first focus entity in a different location of the display and plotting the second focus entity in the first location.

15. The computer-readable medium of claim 13 wherein creating the first markup language document comprises creating image information specifying a graphical image representing a focus entity for plotting in the first graphic display; label information specifying a label associated with the graphical image for plotting in the first graphic display; connection information specifying one or more connections between the graphical image and one or more secondary graphical images.

16. The computer-readable medium of claim 15 wherein creating the first markup language document further comprises creating one or more of tool tip information specifying information to display on the display device upon a first interaction with the graphical image; click action information specifying an action to perform upon a second interaction with the graphical image; menu information for specifying a menu to display on the display device upon a third interaction with the graphical image.

17. The computer-readable medium of claim 13 wherein creating the first markup language document further comprises creating menu information specifying a menu to display on the display device upon a first interaction with the one or more connections.

18. A computer-readable medium for displaying a network topology, the computer-readable medium encoded with one or more sequences of instructions, wherein execution of the one or more sequences of instructions by one or more processors causes the one or more processors to perform the steps of:
   generating and sending a request to generate a display of a graph comprising nodes connected by links, wherein the request identifies a first focus entity;
   receiving a first markup language document that contains first graph information based on a data source and describing first nodes and links that are connected to the first focus entity;
   rendering the first markup language in a display device, resulting in plotting the first focus entity and the first nodes and links;
   generating and sending a request to change the display device to focus on a second focus entity;
   receiving a second markup language document that contains only second graph information based on the data source and describing second nodes and links associated with the second focus entity;
   rendering only the second markup language document in the display device by processing the second graph information and merging the second graph information with the first graph information, resulting in plotting both the first focus entity and the second focus entity without repeating rendering of the first markup language document.

19. The computer-readable medium of claim 18 wherein rendering the first markup language document further comprises plotting one or more of tool tip information specifying information to display on the display device upon a first interaction with the graph; click action information for specifying an action to perform upon a second interaction with the graph; and menu information specifying a menu to display on the display device upon a third interaction with the graph.

20. The computer-readable medium of claim 19 wherein selecting a menu option in the menu causes displaying information about one or more links between the first focus entity and one or more of the nodes that are connected to the first focus entity.

21. The computer-readable medium of claim 19 wherein selecting a menu option in the menu causes displaying information about one or more routers associated with the first focus entity.

22. The computer-readable medium of claim 19 wherein selecting a menu option in the menu causes displaying information about one or more subnetworks associated with the first focus entity.

23. The computer-readable medium of claim 18 wherein plotting the first focus entity further comprises displaying connection label information specifying a label associated with a connection that includes a cost parameter that reflects bandwidth of the connection.

24. The computer-readable medium of claim 23 wherein the connection label information comprises a menu that is displayed in response to a user interaction with the connection.

25. A computer system, comprising:
   a bus;
   one or more storage media coupled to said bus and encoded with one or more sequences of instructions; and
   one or more processors coupled to said bus and configured to execute said one or more sequences of instructions wherein, executing said one or more sequences of instructions causes said computer system to perform:
   receiving a request to generate a display of a graph comprising nodes connected by links, wherein the request identifies a first focus entity;
   retrieving, from a data source, first graph information describing the first focus entity and first nodes and links that are connected to the first focus entity;
   creating a first markup language document that contains the first graph information and which, when rendered in a display, causes plotting the first focus entity and first nodes and links that are connected to the first focus entity;
   receiving a request to change the display to focus on a second focus entity;
   retrieving second graph information describing only second nodes and links that are connected to the second focus entity, without repeating retrieving the first graph information;
   creating a second markup language document that contains only the second graph information and which causes, when only the second markup language document is rendered in the display, plotting both the first focus entity and the second focus entity without repeated rendering of the first markup language document.

26. The computer system as recited in claim 25 wherein the instructions that cause rendering the first markup language document comprise instructions that cause plotting the first focus entity in a first location in the display, and wherein the instructions that cause rendering the second markup language document comprise instructions that cause plotting the first focus entity in a different location of the display and plotting the second focus entity in the first location.

27. The computer system as recited in claim 25 wherein the instructions that cause creating the first markup language document comprise instructions that cause creating image information specifying a graphical image representing a focus entity for plotting in the first graphic display; label information specifying a label associated with the graphical image for plotting in the first graphic display; connection information specifying one or more connections between the graphical image and one or more secondary graphical images.

28. The computer system as recited in claim 27 wherein the instructions that cause creating the first markup language document further comprise instructions that cause creating one or more of tool tip information specifying information to display on the display device upon a first interaction with the graphical image; click action information specifying an action to perform upon a second interaction with the graphical image; menu information for specifying a menu to display on the display device upon a third interaction with the graphical image.

29. The computer system as recited in claim 25 wherein the instructions that cause creating the first markup language document further comprise instructions that cause creating menu information specifying a menu to display on the display device upon a first interaction with the one or more connections.

30. An apparatus for plotting a graph using a markup language, comprising:
  means for receiving a request to generate a display of a graph comprising nodes connected by links, wherein the request identifies a first focus entity;
  means for retrieving, from a data source, first graph information describing the first focus entity and first nodes and links that are connected to the first focus entity;
  means for creating a first markup language document that contains the first graph information and which, when rendered in a display, causes plotting the first focus entity and first nodes and links that are connected to the first focus entity;
  means for receiving a request to change the display to focus on a second focus entity;
  means for retrieving second graph information describing only second nodes and links that are connected to the second focus entity, without repeating retrieving the first graph information; and
  means for creating a second markup language document that contains only the second graph information and which causes, when only the second markup language document is rendered in the display, plotting both the first focus entity and the second focus entity without repeated rendering of the first markup language document.

31. The apparatus as recited in claim 30 wherein the means for rendering the first markup language document comprises means for plotting the first focus entity in a first location in the display, and wherein the means for rendering the second markup language document comprises means for plotting the first focus entity in a different location of the display and plotting the second focus entity in the first location.

32. The apparatus as recited in claim 30 wherein the means for creating the first markup language document comprises means for creating image information specifying a graphical image representing a focus entity for plotting in the first graphic display; label information specifying a label associated with the graphical image for plotting in the first graphic display; connection information specifying one or more connections between the graphical image and one or more secondary graphical images.

33. The apparatus as recited in claim 32 wherein the means for creating the first markup language document further comprises means for creating one or more of tool tip information specifying information to display on the display device upon a first interaction with the graphical image; click action information specifying an action to perform upon a second interaction with the graphical image; menu information for specifying a menu to display on the display device upon a third interaction with the graphical image.

34. The apparatus as recited in claim 30 wherein the means for creating the first markup language document further comprises means for creating menu information specifying a menu to display on the display device upon a first interaction with the one or more connections.

* * * * *